United States Patent
Hoshikawa

(10) Patent No.: US 9,951,686 B2
(45) Date of Patent: Apr. 24, 2018

(54) BEARING STRUCTURE FOR MULTI-LINK-TYPE PISTON CRANK MECHANISM FOR INTERNAL COMBUSTION ENGINES

(71) Applicant: NISSAN MOTOR CO., LTD., Yokohama-shi, Kanagawa (JP)

(72) Inventor: Hiroaki Hoshikawa, Kanagawa (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 0 days.

(21) Appl. No.: 14/899,751

(22) PCT Filed: Apr. 24, 2014

(86) PCT No.: PCT/JP2014/061558
§ 371 (c)(1),
(2) Date: Dec. 18, 2015

(87) PCT Pub. No.: WO2014/203618
PCT Pub. Date: Dec. 24, 2014

(65) Prior Publication Data
US 2016/0138467 A1 May 19, 2016

(30) Foreign Application Priority Data
Jun. 20, 2013 (JP) .................. 2013-129506

(51) Int. Cl.
*F02D 15/02* (2006.01)
*F02B 75/04* (2006.01)
(Continued)

(52) U.S. Cl.
CPC .......... *F02B 75/045* (2013.01); *F01M 11/02* (2013.01); *F02B 41/04* (2013.01); *F02B 75/32* (2013.01);
(Continued)

(58) Field of Classification Search
CPC .... F02B 75/048; F02B 75/045; F02B 75/044; F02B 75/04; F02D 15/02
(Continued)

(56) References Cited

U.S. PATENT DOCUMENTS 3,734,580 A * 5/1973 Piscitelli ................ F16C 33/74
　　　　　　　　　　　　　　　　　　　　　277/347
8,813,715 B2 8/2014 Kasai et al.
(Continued)

FOREIGN PATENT DOCUMENTS

DE　　15 76 354 A1　4/1970
JP　　63-179114 A　　7/1988
(Continued)

*Primary Examiner* — Jacob Amick
*Assistant Examiner* — Charles Brauch
(74) *Attorney, Agent, or Firm* — Foley & Lardner LLP

(57) ABSTRACT

A crankshaft bearing part (11) has a pair of main bearing metals (41), and lubricating oil is guided from an oil gallery to an inner circumferential oil groove (43) through an in-block oil passage (33) and a first oil hole (42). Some of the lubricating oil is supplied to a control shaft bearing part (17) via a second oil hole (44) and an in-cap oil passage (34). Lubricating oil is guided from a third oil hole (46) in a pair of control shaft bearing metals (45) to an inner circumferential oil groove (47). The oil groove (43) in the crankshaft bearing part (11) functions also as an oil passage for supplying lubricating oil to the control shaft bearing part (17), thereby achieving a simple configuration.

7 Claims, 4 Drawing Sheets

(51) Int. Cl.
 *F02B 75/32* (2006.01)
 *F02B 41/04* (2006.01)
 *F01M 11/02* (2006.01)
 *F16C 9/00* (2006.01)
 *F16C 33/10* (2006.01)
 *F02F 7/00* (2006.01)

(52) U.S. Cl.
 CPC ............ *F16C 9/00* (2013.01); *F16C 33/1045* (2013.01); *F01M 2011/026* (2013.01); *F02B 75/04* (2013.01); *F02B 75/044* (2013.01); *F02B 75/048* (2013.01); *F02D 15/02* (2013.01); *F02F 7/0053* (2013.01)

(58) Field of Classification Search
 USPC ....................................................... 123/48 B
 See application file for complete search history.

(56) References Cited

U.S. PATENT DOCUMENTS

| | | | |
|---|---|---|---|
| 2004/0163614 A1* | 8/2004 | Hiyoshi | F02B 75/048 123/48 B |
| 2005/0252479 A1* | 11/2005 | Virr | F01M 11/02 123/196 R |
| 2006/0002643 A1* | 1/2006 | Aubele | F16C 33/1045 384/288 |
| 2006/0096810 A1 | 5/2006 | Eto et al. | |
| 2009/0288643 A1 | 11/2009 | Kono et al. | |

FOREIGN PATENT DOCUMENTS

| | | | | |
|---|---|---|---|---|
| JP | 2004-116434 A | 4/2004 | | |
| JP | 2005-002839 A | 1/2005 | | |
| JP | 2006-132456 A | 5/2006 | | |
| JP | 2007-239497 A | 9/2007 | | |
| JP | 2008-020028 A | 1/2008 | | |
| JP | 2008-075631 A | 4/2008 | | |
| JP | 2008151297 A | * 7/2008 | ............ | F16C 17/022 |
| JP | 2009-281242 A | 12/2009 | | |
| JP | 2012-172625 A | 9/2012 | | |

* cited by examiner

BEARING STRUCTURE FOR MULTI-LINK-TYPE PISTON CRANK MECHANISM FOR INTERNAL COMBUSTION ENGINES

TECHNICAL FIELD

The present invention relates generally to an internal combustion engine including a multi-link-type piston crank mechanism, and particularly to a bearing structure for a crankshaft and a control shaft in the multi-link-type piston crank mechanism.

BACKGROUND ART

As disclosed by a patent document 1, as a piston crank mechanism in an internal combustion engine, a multi-link-type piston crank mechanism is commonly known which includes: a lower link supported by a crank pin of a crankshaft; an upper link connecting a first end portion of the lower link to a piston pin; and a control link connecting a second end portion of the lower link to an eccentric shaft part of a control shaft.

In such a multi-link-type piston crank mechanism, a crankshaft and a control shaft are required to be rotatably supported individually. Patent document 1 discloses a bearing structure where the crankshaft is supported between a bulkhead of a cylinder block and a main bearing cap, and a control shaft bearing cap is attached to an underside of the main bearing cap, and the control shaft is supported therebetween.

The control shaft bearing cap has a bearing beam structure where a plurality of bearing caps are connected in a ladder form by a beam part extending in an engine longitudinal direction, and is configured to supply lubricating oil to the control shaft bearing part from an oil gallery formed in the beam part.

A patent document 2 does not relate to a multi-link-type piston crank mechanism, but discloses supporting a main journal part of a crankshaft via half-split main bearing metals, and forming an oil groove extending circumferentially in an inner peripheral surface of the main bearing metals.

For the configuration as in patent document 1 where lubricating oil is supplied to the control shaft bearing part via the inside of the beam, it is necessary to form the control shaft bearing cap in the bearing beam structure, thereby leading to a low flexibility of design. Moreover, the bearing beam structure provided with the oil gallery leads to a complicated configuration.

PRIOR ART DOCUMENT(S)

Patent Document(s)

Patent Document 1: JP 2004-116434 A
Patent Document 2: JP 2008-20028 A

SUMMARY OF THE INVENTION

According to the present invention, a bearing structure for a multi-link-type piston crank mechanism for an internal combustion engine is configured so that: the multi-link-type piston crank mechanism includes: a lower link supported by a crank pin of a crankshaft; an upper link connecting a first end portion of the lower link to a piston pin; and a control link connecting a second end portion of the lower link to an eccentric shaft part of a control shaft; the crankshaft is rotatably supported by a crankshaft bearing part via half-split main bearing metals, wherein the crankshaft bearing part is formed by a cylinder block and a main bearing cap; the control shaft is rotatably supported by a control shaft bearing part via half-split control shaft bearing metals, wherein the control shaft bearing part is formed by the main bearing cap and a control shaft bearing cap; and the bearing structure further comprises: an in-block oil passage formed in the cylinder block, and extending from an oil gallery of the cylinder block to the crankshaft bearing part; a first oil hole formed and opened in the main bearing metals, and corresponding to a distal end opening of the in-block oil passage; an oil groove formed to extend circumferentially and entirely in an inner periphery of the main bearing metals, and communicating with the first oil hole; a second oil hole formed and opened in the main bearing metals, and communicating with the oil groove, in a region closer to the main bearing cap; an in-cap oil passage formed in the main bearing cap, and including a first end corresponding to the second oil hole, and including a second end reaching the control shaft bearing part; and a third oil hole formed and opened in the control shaft bearing metals, and corresponding to a distal end opening of the in-cap oil passage.

In the above configuration, lubricating oil is supplied from the oil gallery of the cylinder block to the control shaft bearing part via the crankshaft bearing part.

Specifically, lubricating oil is supplied from the oil gallery to the crankshaft bearing part via the in-block oil passage, and then guided to the inner peripheral side of the main bearing metals via the first oil hole. This serves to lubricate sliding surfaces between the crankshaft and the main bearing metals. The lubricating oil further arrives at the second oil hole via the oil groove in the inner peripheral surface of the main bearing metals, and is supplied from the second oil hole to the control shaft bearing part via the in-cap passage. Then, the lubricating oil is guided from the in-cap passage to the inner peripheral side of the control shaft bearing metals via the third oil hole, and serves to lubricate sliding surfaces between the control shaft and the control shaft bearing metals.

According to the present invention, the feature that lubricating oil is supplied from the oil gallery of the cylinder block to the control shaft bearing part via the oil groove of the crankshaft bearing part, serves to eliminate the necessity of forming the control shaft bearing cap in the beam structure, and thereby enhance the flexibility of design, and thereby simplify the oil passage configuration.

MODE(S) FOR CARRYING OUT THE INVENTION

The following describes an embodiment of the present invention in detail with reference to the drawings.

Figure 1:
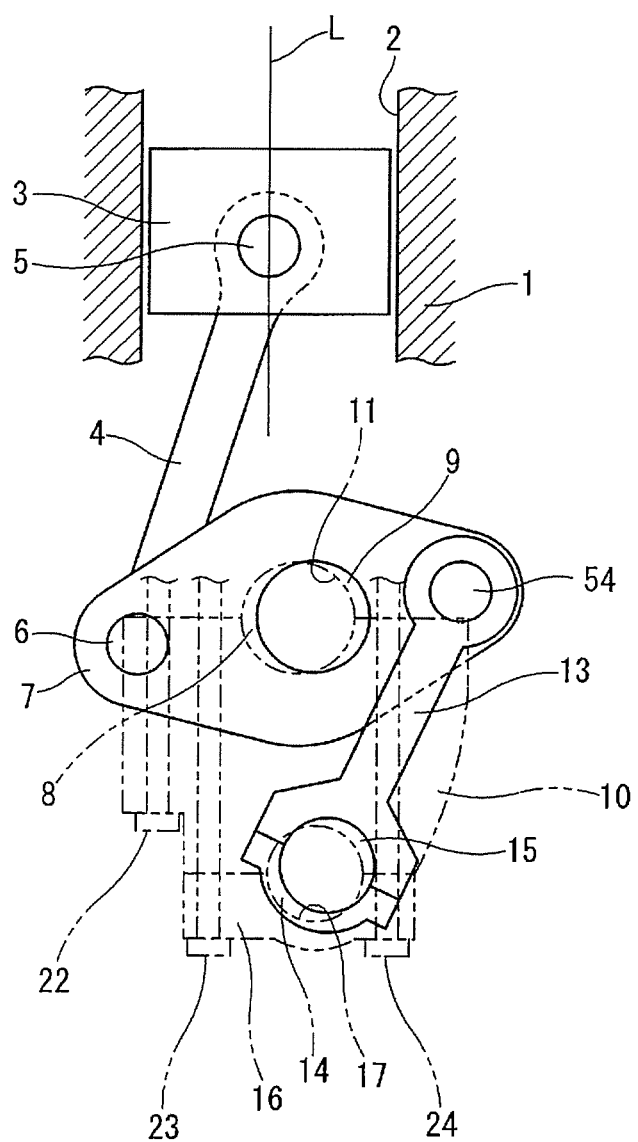
FIG. 1 is an illustrative diagram showing configuration of a multi-link-type piston crank mechanism according to an embodiment of the present invention.

First, the following describes configuration of a multi-link-type piston crank mechanism according to the embodiment with reference to FIG. 1. As shown in FIG. 1, a cylinder block 1 is formed with a cylinder 2, and a piston 3 is slidably mounted in cylinder 2, and a first end of an upper link 4 is swingably connected to piston 3 via a piston pin 5. A second end of upper link 4 is rotatably connected to a first end portion of a lower link 7 via a first link pin 6. Lower link 7 is swingably attached at its central portion to a crank pin 9 of a crankshaft 8. Crankshaft 8 is rotatably supported by a crankshaft bearing part 11 that is formed by cylinder block 1 and a main bearing cap 10.

A first end of a control link 13 is rotatably connected to a second end portion of lower link 7 via a second link pin 54. A second end of control link 13 is fitted rotatably on an eccentric shaft part 15 of a control shaft 14. Control shaft 14 is arranged under crankshaft 8 and in parallel with crankshaft 8, and is rotatably supported by a control shaft bearing part 17 that is formed by main bearing cap 10 and a control shaft bearing cap 16.

Figure 2:
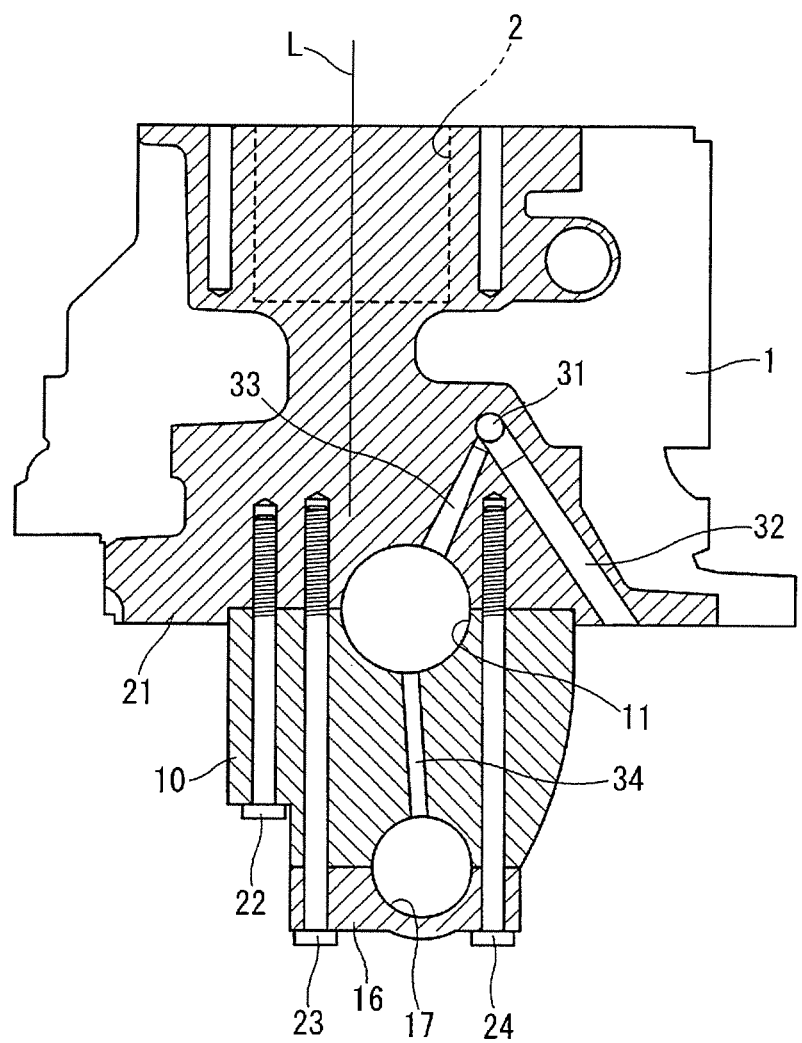
FIG. 2 is a sectional view showing a bearing structure according to the embodiment with oil passages.

As shown in FIG. 2, main bearing cap 10 is attached to an underside of cylinder block 1, specifically, an underside of a bulkhead 21 between cylinders, by three bolts 22, 23 and 24. Control shaft bearing cap 16 is attached to an underside of main bearing cap 10. Specifically, two bolts 23 and 24 extend through both of main bearing cap 10 and control shaft bearing cap 16, and fix both of main bearing cap 10 and control shaft bearing cap 16 to cylinder block 1 in a so-called common fastening manner. As shown in FIG. 2, two bolts 23 and 24 extend on respective sides of crankshaft bearing part 11 and control shaft bearing part 17 which are in the form of circular opening. The joint plane between main bearing cap 10 and bulkhead 21 and the joint plane between main bearing cap 10 and control shaft bearing cap 16 are parallel to each other, and are perpendicular to a central axis L of cylinder 2.

Each Bolt 22-24 may be a normal bolt provided with a head portion, or a stud bolt that is used in combination with a nut.

The following describes a system for supplying lubricating oil to crankshaft bearing part 11 and control shaft bearing part 17.

As shown in FIG. 2, an oil gallery 31 is formed in cylinder block 1 (close to an upper side of a skirt portion closer to control link 13), extending straight in the direction of the array of cylinders. Oil gallery 31 communicates with a discharge side of an oil pump not shown via an oil supply passage 32. An in-block oil passage 33 is formed to extend in bulkhead 21 of cylinder block 1, and extend from oil gallery 31 to crankshaft bearing part 11. In-block oil passage 33 is an oil passage having a straight shape, which is formed by drilling from the underside of cylinder block 1, and extends toward a center of crankshaft bearing part 11 having a circular shape, with inclination from central axis L of cylinder 2. In-block oil passage 33 has a moderately tapered shape that is slightly larger in diameter at a side closer to crankshaft bearing part 11.

An in-cap oil passage 34 is formed in main bearing cap 10, extending from a lowermost portion of crankshaft bearing part 11 having a circular shape, to an uppermost portion of control shaft bearing part 17 having a circular shape similarly. In-cap oil passage 34 is formed by drilling to extend straight through from a semicircular recessed portion constituting the crankshaft bearing part 11 at the upper side of main bearing cap 10, to a semicircular recessed portion constituting the control shaft bearing part 17 at the lower side of main bearing cap 10. As shown in FIG. 2, in a state where central axis L of cylinder 2 is set vertical, the center of crankshaft bearing part 11 and the center of control shaft bearing part 17 are offset slightly from each other in the lateral direction. Specifically, the center of control shaft bearing part 17 is slightly closer to the right side of FIG. 2, namely, closer to control link 13, with respect to the center of crankshaft bearing part 11. Accordingly, in-cap oil passage 34, which extends from the lowermost portion of crankshaft bearing part 11 to the uppermost portion of control shaft bearing part 17, is inclined slightly from the central axis L of cylinder 2. As is clear from FIG. 2 and others, the diameter of control shaft 14 (specifically, the diameter of a journal portion of control shaft 14) is smaller than the diameter of crankshaft 8 (specifically, the diameter of a journal portion of crankshaft 8).

Figure 3:
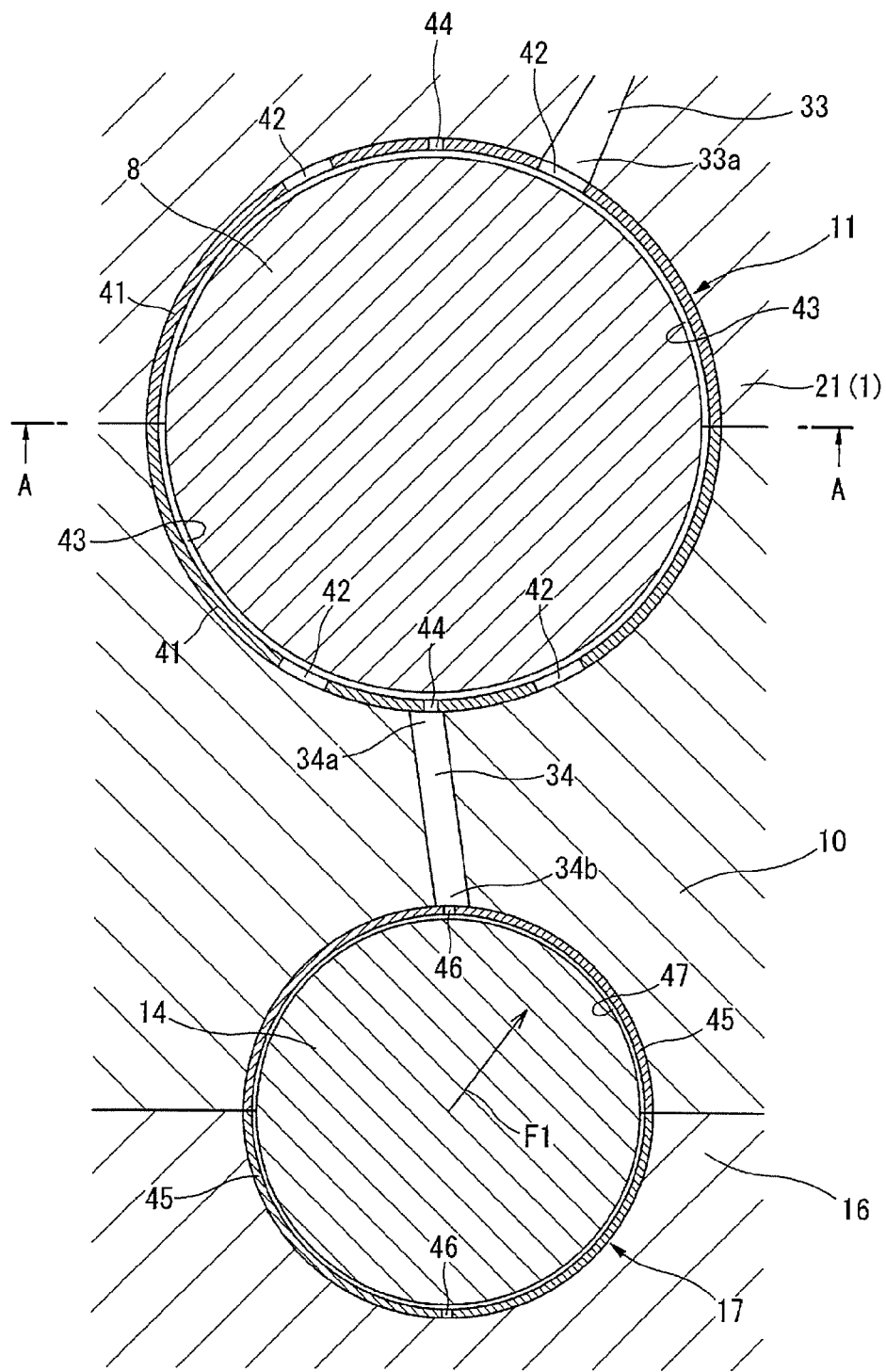
FIG. 3 is a sectional view showing details of oil passages in a crankshaft bearing part and a control shaft bearing part.

FIG. 3 shows details of oil passages in both bearing parts 11 and 17. As shown in FIG. 3, a pair of half-split main bearing metals (i.e., bearing metal pieces) 41 are attached to crankshaft bearing part 11, and crankshaft 8 is rotatably supported via main bearing metals 41. Each main bearing metal 41 has a semicylindrical shape, and is attached to a semicircular recessed portion of bulkhead 21 or a semicircular recessed portion of main bearing cap 10, respectively, with its rotation prevented. For preventing the rotation of main bearing metal 41 in crankshaft bearing part 11, an engaging portion in the form of a claw or the like is provided, although it is omitted from the drawings.

Figure 4:
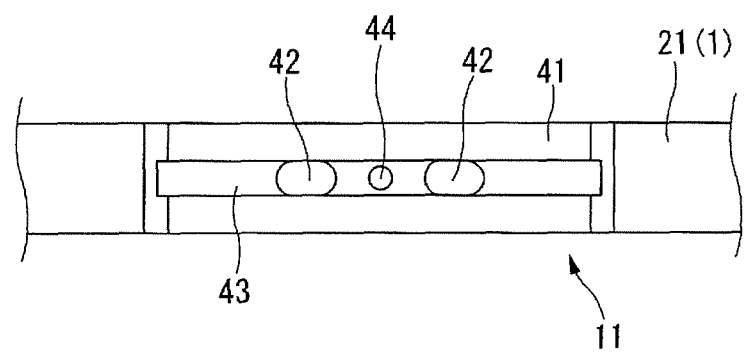
FIG. 4 is a sectional view showing an inner peripheral side of main bearing metals, taken along the line A-A in FIG. 3.

Main bearing metal 41 is formed with a first oil hole 42 at a position corresponding to a distal end opening part 33a of in-block oil passage 33, wherein first oil hole 42 has an elliptic shape extending circumferentially as shown in FIG. 4. First oil hole 42 is located at a diagonal position of the semicylindrical shape, out of a central position (i.e. the position of 90°) of the semicylindrical shape, in the circumferential direction thereof. In the present embodiment, for eliminating the necessity of care about the direction of main bearing metal 41 during assembling, two first oil holes 42 are formed and opened at two spots symmetrical to each other with respect to the central position of 90°, respectively. The pair of main bearing metals 41 are completely identical to each other as components, so that the main bearing metal 41 arranged closer to main bearing cap 10 also includes a pair of first oil holes 42. With regard to the position in the axial to direction of main bearing metal 41, these first oil holes 42 are arranged at the center of the axial length of main bearing metal 41, so that first oil holes 42 are located at a fixed position irrespective of the posture of main bearing metal 41 during assembling.

The inner peripheral surface of main bearing metals 41 is formed with an oil groove 43 extending circumferentially and entirely. Oil groove 43 is arranged at the center of semicylindrical main bearing metal 41, in the axial direction thereof. As shown in FIG. 4, oil groove 43 has a width corresponding to the minor axis length of first oil hole 42. Namely, first oil hole 42 is opened to oil groove 43.

A second oil hole 44 having a perfect circular shape is formed and opened at a central position of semicylindrical main bearing metal 41 in the circumferential direction (namely, at the position of 90°). Second oil hole 44 is also arranged at a central position of main bearing metal 41 in the axial direction thereof, and is thereby opened at the inner peripheral side to oil groove 43 as shown in FIG. 4. As described above, the pair of main bearing metals 41 are identical to each other as components, so that when assembled, second oil holes 44 exist at the uppermost portion and the lowermost portion of crankshaft bearing part 11. The second oil hole 44 at the lowermost portion is located at a position corresponding to an upper end opening part 34a of in-cap oil passage 34. Since second oil hole 44 is arranged at the center both in the circumferential direction and in the axial direction, the lower second oil hole 44 always corresponds to in-cap oil passage 34, however two main bearing metals 41 are assembled.

Similar to main bearing metals 41, a pair of half-split control shaft bearing metals (i.e., bearing metal pieces) 45 are attached to control shaft bearing part 17, and control shaft 14 is rotatably supported via control shaft bearing metals 45. Each of control shaft bearing metals 45 has a semicylindrical shape, and is attached to a semicircular recessed portion of main bearing cap 10 or a semicircular recessed portion of control shaft bearing cap 16, respectively, with its rotation prevented. For preventing the rotation of control shaft bearing metal 45 in control shaft bearing part 17, an engaging portion not shown is provided.

A third oil hole 46 having a perfect circular shape is formed and opened at a central position of semicylindrical control shaft bearing metal 45 in the circumferential direction (namely, at the position of 90°). Third oil hole 46 is also arranged at the center of control shaft bearing metal 45 in the axial direction thereof. Similar to main bearing metals 41, the pair of control shaft bearing metals 45 are identical to each other as components, so that when assembled, third oil holes 46 exist at the uppermost portion and the lowermost portion of control shaft bearing part 17. The third oil hole 46 at the uppermost portion is located at a position corresponding to a lower end opening part 34b of in-cap oil passage 34. Since third oil hole 46 is arranged at the center both in the circumferential direction and in the axial direction, the upper third oil hole 46 always corresponds to in-cap oil passage 34, however two control shaft bearing metals 45 are assembled.

The inner peripheral surface of control shaft bearing metals 45 is formed with an oil groove 47 extending circumferentially and entirely. Third oil hole 46 is opened at the inner peripheral side to oil groove 47. Oil groove 47 is arranged at the center of control shaft bearing metal 45 in the axial direction thereof.

With regard to dimensions of parts, the opening area of first oil hole 42 in the form of the elliptic hole at crankshaft bearing part 11 is larger than the opening area of second oil hole 44. The diameter of second oil hole 44 in the form of the perfect circular shape is smaller than the diameter of upper end opening part 34a of in-cap oil passage 34 faced by second oil hole 44. Furthermore, the diameter of second oil hole 44 corresponding to upper end opening part 34a of in-cap oil passage 34 is larger than the diameter of third oil hole 46 corresponding to lower end opening part 34b of in-cap oil passage 34. The shape of first oil hole 42 may be modified into a circular shape larger in diameter than second oil hole 44, so that the opening area of first oil hole 42 is larger than that of second oil hole 44.

In FIG. 3, for convenience for illustration, crankshaft bearing part 11 and control shaft bearing part 17 are illustrated as closer to each other than actual, so that the length of in-cap oil passage 34 is shorter than actual.

In the configuration described above, highly-pressurized lubricating oil in oil gallery 31 is supplied to crankshaft bearing part 11 via in-block oil passage 33. In crankshaft bearing part 11, lubricating oil is guided to the inner peripheral oil groove 43 via first oil hole 42 of main bearing metal 41, so that the entire sliding surfaces between crankshaft 8 and main bearing metals 41 are lubricated reliably via oil groove 43.

Part of the lubricating oil supplied to oil groove 43 enters the in-cap oil passage 34 via the second oil hole 44 at the lower portion of crankshaft bearing part 11, and is supplied to control shaft bearing part 17 via in-cap oil passage 34. In control shaft bearing part 17, lubricating oil is guided to the inner peripheral oil groove 47 via the third oil hole 46 of control shaft bearing metal 45, so that the entire sliding surfaces between control shaft 14 and control shaft bearing metals 45 are lubricated reliably via oil groove 47.

In this way, in the configuration described above, oil groove 43 in the bearing surface of crankshaft bearing part 11 functions to distribute lubricating oil entirely in the circumferential direction, and also functions as an oil passage for supplying lubricating oil to control shaft bearing part 17 on the lower side. This serves to simplify the configuration for supplying lubricating oil to control shaft bearing part 17. If an oil groove is formed between the inner peripheral surface of crankshaft bearing part 11 and main bearing metal 41, contact pressure on the outer peripheral surface of main bearing metal 41 becomes high undesirably. In the configuration described above, since oil groove 43 required for lubrication of crankshaft 8 is used to supply lubricating oil to control shaft bearing part 17, there is no problem of contact pressure increase resulting from oil passage formation.

As described above, with regard to oil groove 43 of crankshaft bearing part 11, the opening area of first oil hole 42 as an inlet of lubricating oil, is set larger than that of second oil hole 44 as an outlet of lubricating oil. This serves to achieve reliable lubrication of crankshaft 8 and reliable supply of lubricating oil for control shaft bearing part 17 simultaneously.

Moreover, the feature that the opening area of third oil hole 46 is smaller than that of second oil hole 44, serves to allow the in-cap oil passage 34 to be constantly filled with lubricating oil, and thereby stabilize constantly lubricating oil supply to control shaft bearing part 17. Namely, this serves to suppress the occurrence of transient shortage of lubricating oil in control shaft bearing part 17 that is located relatively far from oil gallery 31.

The diameter of in-cap oil passage 34 is larger than the diameter of second oil hole 44 and the diameter of third oil hole 46, so that the effective cross-sectional flow area of in-cap oil passage 34 is adjusted by the diameter of second oil hole 44 and the diameter of third oil hole 46. This serves to enhance the precision of the cross-sectional flow area, and make it easy to process the in-cap oil passage 34. Since in-cap oil passage 34 is formed by drilling to have a relatively long passage form, it is difficult to form a small-diameter hole straight precisely. With the configuration described above, in-cap oil passage 34 can be formed as a hole having a relatively large diameter.

On the other hand, when the combustion pressure is maximal during the combustion cycle, control shaft 14 is applied with a load in a direction of an arrow F1 (see FIG. 3) that is substantially identical to the inclined posture of control link 13. Third oil hole 46 at control shaft bearing part 17 is arranged out of the circumferential position in the load direction F1, so that there is no problem of contact pressure increase at the sliding surfaces which results from third oil hole 46.

In the present embodiment, there is no problem of incorrect assembling, however the pair of main bearing metals 41 are assembled. This is true also for the pair of control shaft bearing metals 45.

The invention claimed is:
1. A bearing structure for a multi-link-type piston crank mechanism for an internal combustion engine, wherein:

the multi-link-type piston crank mechanism includes
   a lower link supported by a crank pin of a crankshaft;
   an upper link connecting a first end portion of the lower link to a piston pin; and
   a control link connecting a second end portion of the lower link to an eccentric shaft part of a control shaft;
the crankshaft is rotatably supported by a crankshaft bearing part via half-split main bearing metal pieces, wherein the crankshaft bearing part is formed by a cylinder block and a main bearing cap;
the control shaft is rotatably supported by a control shaft bearing part via half-split control shaft bearing metal pieces, wherein the control shaft bearing part is formed by the main bearing cap and a control shaft bearing cap; and
the bearing structure further comprises
   an in-block oil passage formed in the cylinder block, and extending from an oil gallery of the cylinder block to the crankshaft bearing part;
   a first oil hole formed and opened in the main bearing metal pieces, and corresponding to a distal end opening of the in-block oil passage;
   a single oil groove formed to extend circumferentially and entirely in an interior of an inner periphery of the main bearing metal pieces, and communicating with the first oil hole and the crankshaft;
a second oil hole formed and opened in the main bearing metal pieces, and communicating with the oil groove, in a region closer to the main bearing cap;
an in-cap oil passage formed in the main bearing cap, and including a first end corresponding to the second oil hole, and including a second end reaching the control shaft bearing part; and
   a third oil hole formed and opened in the control shaft bearing metal pieces, and corresponding to a distal end opening of the in-cap oil passage.

2. The bearing structure for the multi-link-type piston crank mechanism for the internal combustion engine as claimed in claim 1, wherein the second oil hole is smaller in diameter than the in-cap oil passage.

3. The bearing structure for the multi-link-type piston crank mechanism for the internal combustion engine as claimed in claim 1, wherein the first oil hole is larger in opening area than the second oil hole.

4. The bearing structure for the multi-link-type piston crank mechanism for the internal combustion engine as claimed in claim 1, wherein the second oil hole is larger in diameter than the third oil hole.

5. The bearing structure for the multi-link-type piston crank mechanism for the internal combustion engine as claimed in claim 1, wherein the third oil hole is arranged away from a circumferential position in a direction of a load from the control link, wherein the load is applied from the control link to the control shaft under maximal combustion pressure.

6. The bearing structure for the multi-link-type piston crank mechanism for the internal combustion engine as claimed in claim 1, wherein the second oil hole is opened at a central position in a circumferential direction, and at a central position in an axial direction, of the main bearing metal pieces having a semicylindrical shape.

7. The bearing structure for the multi-link-type piston crank mechanism for the internal combustion engine as claimed in claim 1, wherein the third oil hole is opened at a central position in a circumferential direction, and at a central position in an axial direction, of the control shaft bearing metal pieces having a semicylindrical shape.

* * * * *